Nov. 10, 1970  L. A. SMITZER  3,539,254

FILM TRANSPORT

Filed Jan. 9, 1968

LOUIS A. SMITZER

BY Anderson, Luedeka, Fitch, Even & Tabin
ATTORNEYS

United States Patent Office 3,539,254
Patented Nov. 10, 1970

3,539,254
FILM TRANSPORT
Louis A. Smitzer, San Diego, Calif., assignor, by mesne assignments, to Stromberg Datagraphix, Inc., San Diego, Calif., a corporation of Delaware
Filed Jan. 9, 1968, Ser. No. 696,637
Int. Cl. G03b 1/48
U.S. Cl. 353—95                        9 Claims

ABSTRACT OF THE DISCLOSURE

A film transport is described which transports film through a view station, which automatically stops the film at each frame with the frame centered at the view station, and which restarts the film after a dwell time which is selectively variable.

---

This invention relates to film transports and, more particularly, to an improved film transport which automatically transports non-perforated film through a view station.

In some kinds of film viewing systems, such as microfilm readers, it is desirable to provide for intermittent movement of the film. Preferably, the film is moved in a repetitive sequence which provides, in each cycle, for advancing the film rapidly a distance of one frame, stopping the frame at a viewing position with its image centered on the viewing screen, and holding the frame at rest for a brief viewing period. Although stopping, alignment, and fine adjustment of each frame at a viewing position at the view station may be accomplished by an operator through visual observation and manual manipulation, such a repetitious task may become tedious to the operators when a large number of frames are to be observed. It is therefore desirable to accomplish the advance, alignment and holding of successive frames at a view station automatically.

Some film transports for moving film through a view station while aligning and holding successive frames of the film for observation have included sprocketed positioning devices which utilize perforated film. Because perforated film is subject to wear upon repeated usage and is considerably more expensive for comparable image sizes, it is desirable to utilize non-perforated film. Non-perforated film is best controlled by using non-mechanical means for aligning the film and for sensing the film position. Heretofore, film transports for intermittently aligning successive frames on non-perforated film at a view station have been unsatisfactory in some respects. In particular, prior art film transports of this type have frequently involved excessive complexity such as multiple photocells or intermittently operating light sources. Some prior art transports have required a manual operation on the part of the operator in order to initiate movement of the film after each frame is viewed. Microfilm viewers in which film motion is continuous fatigue the operator's eyes and require the inclusion of visible coding bars of substantial length between the frames, thereby wasting a large portion of the film's area.

Film transports wherein step-like movement of film from frame to frame occurs automatically, as in this invention, have been found to be advantageously made more versatile by providing means to accommodate varying requirements of "dwell," that is, the time that the film frame is stopped and aligned for viewing. Selectable dwell is convenient because the viewing time required for visual observance or for otherwise monitoring certain types of information on a frame may vary, depending upon the nature and quantity of the information. Preferably the time required to advance the film a distance of one frame should be always as short as possible. Hence, it should not vary as the dwell time is selectively varied. A short advance time minimizes the time required to scan a given length of film. A short advance time together with a selected dwell time of greater length also can be used to produce a stroboscopic display wherein certain parts of the image, such as page numbers, may appear to be stationary or to change only slowly.

It is therefore an object of this invention to provide an improved film transport.

Another object of the invention is to provide a film transport for automatically moving non-perforated film in a manner which stops and aligns successive frames on the film at a viewing station.

It is another object of the invention to provide an automatic film transport for non-perforated film in which the "dwell" time is variable and the advance time is rapid and fixed.

Other objects of the invention will became apparent to those skilled in the art from the following description, taken in connection with the accompanying drawings wherein.

Figure 2:
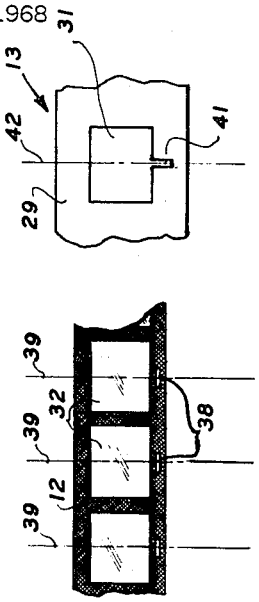
FIG. 2 is a plan view illustrating a portion of film and the film gate used in connection with the invention.

Very generally, the film transport of the invention comprises drive means 11 for transporting the film 12 through a viewing position at a view station 13 and means 14 for controlling the operation of the drive means. The controlling means are responsive to a first input signal to stop the drive means at the viewing position after a given time interval from receipt of the first input signal. The controlling means are also responsive to a second input signal to operate the drive means. Sensing means 16 supply a first input signal to the controlling means the given time interval prior to arrival of a frame of the film at the viewing position. Variable delay means 17 supply a second input signal to the controlling means after a predetermined adjustable time interval from the stopping of the drive means.

Figure 1:
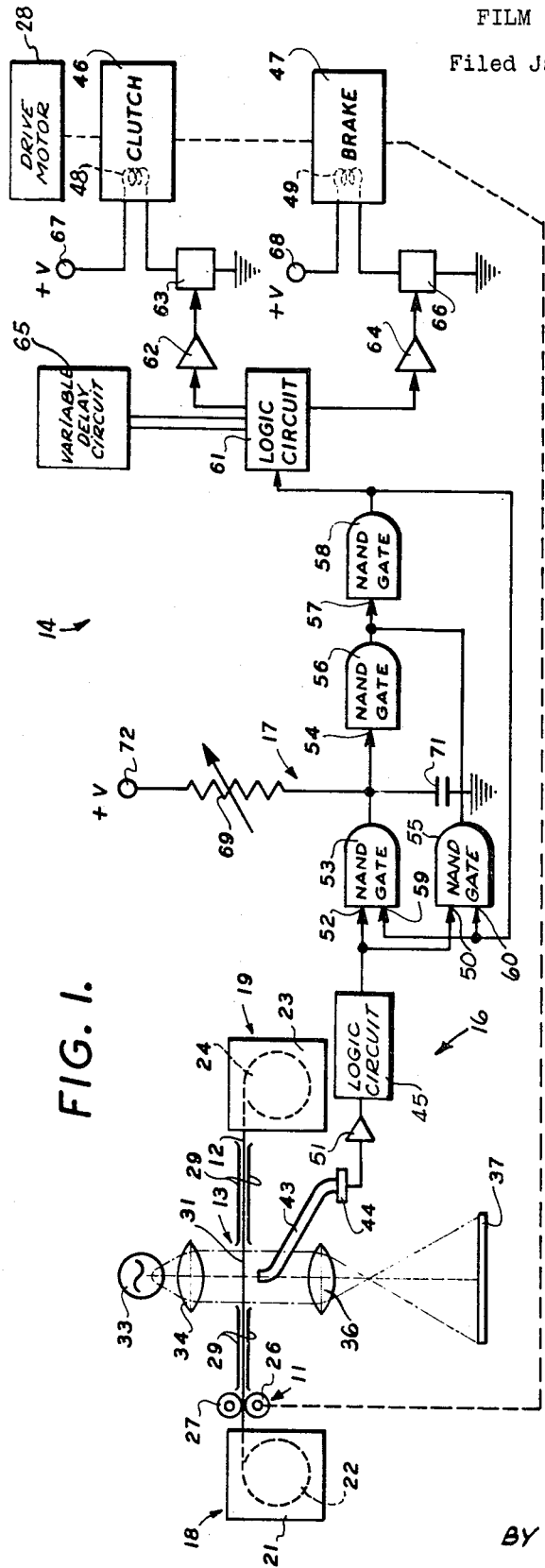
FIG. 1 is a schematic diagram, in block form, illustrating the general configuration of the film transport of the invention including the logic of the circuitry used therein.

Referring now more particularly to FIG. 1, the film is transported through the view station 13 from a supply mechanism 18 to a takeup mechanism 19. In the illustrated embodiment, the supply mechanism 18, shown schematically, includes a cartridge housing 21 containing a supply reel 22 from which the film 12 is withdrawn. Similarly, the takeup mechanism 19 includes a cartridge housing 23 in which is disposed a takeup reel 24 upon which the film is wound after passing through the view station 13. Preferably, the takeup mechanism 19 has suitable means for automatic threading of the film onto the takeup reel. Although the system shown employs cartridge type supply and takeup mechanism, it is to be understood that other types of supply and takeup mechanisms may be utilized in connection with the invention.

The drive means 11 which transport the film 12 through the view station 13 include a driving capstan 26 and a pinch roller 27. The pinch roller 27 is biased against the capstan by suitable resilient means, not illustrated, to cause the film to press against the capstan with sufficient force that the film is driven by the capstan. Motive power for driving the capstan is supplied through a suitable drive system (not shown), such as a belt and pulley arrangement, from a drive motor 28.

Positioning of the film 12 at a desired level in the viewing station 13 is provided by a plurality of film guides 29 appropriately disposed and aligned, as shown schematically in FIG. 1, between the drive means 11 and the takeup mechanism 19. An opening or film gate 31 is provided in the guides 29 at the view station 13.

As may be seen in FIG. 2, the film gate 31 is substantially the same size as the frames 32 on the film 12. Light is directed through the film gate 31 from a lamp 33. A condensing lens 34 is positioned between the lamp and the film gate 31, and a focusing lens 36 is positioned on the opposite side of the film gate 31 from the lamp 33. The focusing lens 36 is used for focusing the image, contained on the particular frame 32 of film which is aligned with the film gate 31, on a target screen 37. The screen 37 may be of any suitable type for providing a visual display of the image or for making a copy of all or part of the image in a reproducing system, not illustrated.

In order to monitor the series of images projected on the screen 37 from successive frames 32 of the film 12, each frame must be centered and held in the film gate 31 for a suitable duration of time. Where non-perforated film is used, some means other than mechanical must ordinarily be devised in order to stop the drive means 11 with the film frame centered in the film gate 31. By stopping the film, it is unnecessary to attempt the difficult task of reading a moving image, and the operator or reproducing device is thereby enabled to monitor the film by scanning a series of stationary images.

In accordance with the present invention, the film 12, by a completely automatic operation, is transported through the view station 13 intermittently to align successive frames 32 on the film with the film gate 31 (the viewing position) for a predetermined adjustable time interval. Referring to FIG. 2, the opaque border of the film adjacent each frame is provided with a signalling area. The signalling areas in the illustrated embodiment each comprise a transparent optical stripe 38. If a film with a transparent border is used, an opaque optical stripe may be provided. Each stripe is parallel to the film edge, and extends across and is bisected by the center line or transverse optical axis 39 of the respective frame to which it is adjacent.

A notch 41 is provided in one edge of the film gate 31 symmetrically located on the transverse optical axis 42 of the film gate. The area illuminated by the light from the lamp 33 projected through the lens 34 (FIG. 1) is sufficient to illuminate the notch 41 as well as the entire area within the film gate 31. The notch 41 is made considerably narrower than the length of the optical stripe, the width of the notch preferably being about one-third or one-fourth the length of the optical stripe. Thus, a narrow beam of light is constantly projected along the border of the film 12 in the path of movement of the optical stripes 38.

Returning now to FIG. 1, as the film moves through the view station 13, the successive optical stripes 38 also pass through the view station. This permits light to pass from the region between the light source and the film gate 31 to the region on the other side of the film gate at a position slightly offset, in a direction transverse to film motion, from the frames 32. A light pipe 43 is positioned at this offset position and is formed of a light-conducting fiber of plastic or other suitable material to conduct light from the region on the opposite side of the film from the light source and adjacent the notch in the film gate 31 to a light sensitive cell 44. The light sensitive cell 44 is coupled through an amplifier 51 to a logic circuit 45 (described below) which produces an electrical signal when light strikes the cell from the light pipe 43. Accordingly, when the narrow beam produced by the film gate notch 41 becomes aligned with one of the optical stripes 38, the logic circuit produces an electrical signal. As will be explained, this signal is used to stop the drive means in a manner such that the particular associated frame 32 of film 12 will be properly aligned with the film gate 31. Such "stop" signals may be produced by other than optical means. Thus, the signalling areas of the film may be magnetized regions and the sensing system may include a magnetic pickup head.

The means 14 which control operation of the drive means 11 include a clutch 46 and a brake 47 mechanically coupled between the drive motor 28 and the capstan 26. The clutch 46 and the brake 47 may be of any suitable type, and may be individual units as shown, or may be a combination brake-clutch type device. With the clutch 46 engaged and the brake 47 disengaged, the drive motor 28 is coupled to the capstan 26. With the clutch 46 disengaged and the brake 47 engaged, the drive motor 28 is decoupled from the capstan 26, and the capstan 26 is held in a fixed position by the brake 47. Actuation or energization of the clutch 46 is accomplished by means of a coil 48. Similarly, actuation or energization of the brake 47 is accomplished by means of a coil 49.

The controlling means 14 are responsive to an input signal from the light sensor 44 of the stopping means 16 to de-energize the clutch 46 and energize the brake 47, thereby stopping the drive means. To accomplish this, the cell 44 is coupled through the amplifier 51 and the logic circuit 45 to one input 52 of a two-input NAND gate 53 and to one input 50 of a two-input NAND gate 55. The NAND gates 53 and 55, as well as the other NAND gates subsequently described, may be portions of integrated circuits. The equivalent circuit of a two-input NAND gate, as is known in the art, may be constructed of a pair of suitably interconnected diodes and one or more associated transistors. If both inputs to a two-input NAND gate are at a given positive voltage, for example +5 volts, the output of the NAND gate is at 0 volt. If either input of a two-input NAND gate is at 0 volt, the output of the NAND gate tends toward the given voltage, in the example +5 volts. If only one input of a two-input NAND gate is utilized and the other is open-circuited, the NAND gate will invert the signal, that is, a 0 voltage input gives a given voltage output, and a given voltage input gives a 0 voltage output. NAND gates are commercially available in groups of four on a monolithic chip from Fairchild Semiconductor, Mountain View, Calif., under the designation DTuL 946.

The output of the NAND gate 53 is connected to the input 54 of a two-input NAND gate 56 (the other input being open-circuited). The output of the NAND gate 56 is connected to the input 57 of a two-input NAND gate 58 (the other input being open-circuited). The output of the NAND gate 55 is also connected to the input 57 of the NAND gate 58. The output of the NAND gate 58 is fed back to the second input 59 of the NAND gate 53 and to the second input 60 of the NAND gate 55. The output of the NAND gate 58 is also applied to a logic circuit 61.

The logic circuit 61 may be of any suitable design known in the art to provide one of two alternate outputs in response to the presence or absence of an input signal. One output of the logic circuit 61 is applied through an amplifier 62 to a suitable semiconductor switch 63. Similarly, the other output of the logic circuit 61 is applied through an amplifier 64 to a suitable semiconductor switch 66. In the presence of an input signal to the logic circuit 61, an output signal is provided to the amplifier 62 and no output signal is provided to the amplifier 64. On the other hand, in the absence of an input signal to the logic circuit 61, an output signal is provided to the amplifier 64 and no output signal is provided to the amplifier 62.

The semiconductor switches 63 and 66 may each be of any suitable type known in the art, such as an appropriately connected switching transistor. Each switch effectively closes in response to a signal applied thereto from its associated amplifier 62 or 64. The semiconductor switch 63 connects the coil 48 of the clutch 46 between a source 67 of energizing voltage and ground. Similarly, the semiconductor switch 66 connects the coil 49 of the brake 47 between a source 68 of energizing voltage and ground. The logic circuit 61 is designed, as previously described, such that when the semiconductor switch 63 is closed, the semiconductor switch 66 is open, and such that when the semiconductor switch 66 is closed, the semiconductor switch 63 is open. In this manner, the clutch 46 and brake 47 operate alternately.

The logic circuit 45 may be of any suitable design to provide a positive output voltage when light is not striking the cell 44, and to drop to a zero output voltage when a transparent strip 38 aligns with the slot 41 and light strikes the cell 44. Thus, when the film is moving through the view station between frames, inputs 52 and 50 to NAND gates 53 and 55, respectively, are positive. As will be explained subsequently, when the film is moving the output of the NAND gate 58 is also positive, causing the inputs 59 and 60 of the NAND gates 53 and 55, respectively, to be positive. Since both inputs of each NAND gate 53 and 55 are positive, the output of the NAND gates 53 and 55 are zero. The zero output of the NAND gate 55 is inverted to a positive output by the NAND gate 58. Even though the input of the NAND gate 56 is at zero, no positive input to the NAND gate 58 results because the output transistor of the equivalent circuit of the NAND gate 55 forms a low impedance path to ground, shunting the output of the NAND gate 56.

When the cell 44 detects the presence of an optical stripe 38 in alignment with the notch 41, the voltage applied by the logic circuit 45 to the inputs 52 and 50 of the NAND gates 53 and 55, respectively, falls to zero. Accordingly, the output of the NAND gate 55 rises immediately to a positive voltage. This positive voltage signal is inverted in the NAND gate 58 to a zero voltage output. The logic circuit 61 is designed such that a 0 signal input produces no output through the amplifier 62 and produces an output through the amplifier 64. This causes the clutch to disengage and the brake to engage, stopping the film.

Figure 3:
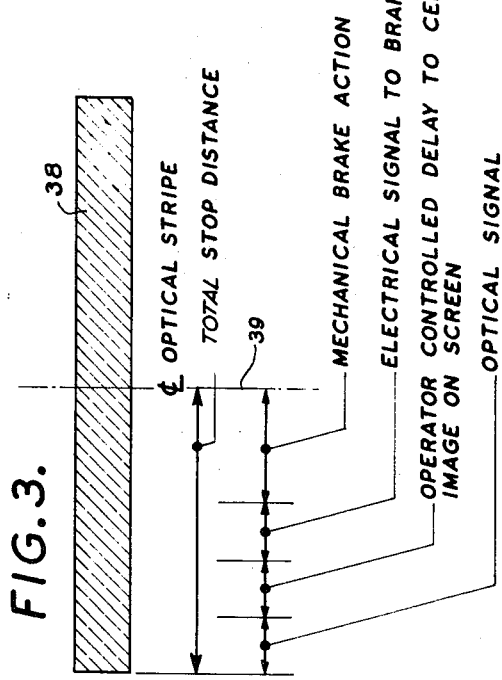
FIG. 3 is a diagram illustrating certain positional relationships of the film with respect to the operation of the film transport of the invention.

Referring to FIG. 3, the timing of the system in order to stop the film with a frame 32 at the viewing position, that is, properly aligned in the film gate 31, is illustrated diagrammatically. In order to stop the film at the viewing position with the optical axis 39 of a frame substantially aligned with the film gate optical axis 42, the total stop distance indicated, measured from the leading edge of the optical stripe, must be equal to one-half the length of the stripe with a reasonable tolerance. If the total stop distance is half the stripe length, the image axis will stop in alignment with the gate axis from film motion in either direction. Thus, the delays of the system are designed to fit within the desired total stopping distance. Such delays, as indicated, include delays in producing the electrical signal from the cell 44 (the response time of the cell), the delay produced in the switch circuitry before the brake is energized (and the clutch de-energized), and the delay caused by the mechanical action of the brake. In addition it will be noted that a certain amount of delay time is intentionally built into the system and is designated as "operator controlled delay to center image on screen." A delay circuit 65 is provided in the controlling means 14 to enable the operator to make a fine adjustment in the system so that the system will consistently stop the frames in proper alignment. The delay circuit 65 may be of any suitable type, and may comprise, for example, a resistance-capacitance circuit connected to four NAND gates such as is described below in connection with the resistance 69, capacitance 71, and NAND gates 53, 55, 56 and 58.

Provision is made for automatically initiating movement of the film to the next succeeding frame after a particular frame has been viewed for a predetermined time interval. Moreover, this time interval is made adjustable so that the so-called dwell time or viewing time of the frames may be selected by the operator for his convenience. To accomplish this, a resistance-capacitance time delay circuit is coupled between the NAND gate 53 and the NAND gate 56. The delay circuit includes a variable resistance 69 and a capacitance 71 connected between a source of potential 72 and ground. The juncture between the resistance 69 and the capacitance 71 is coupled to the input 54 of the NAND gate 56.

When the film is running, the output of the NAND gate 53, is a 0 volt, as previously described, and any charge in the capacitance 71 is dissipated to ground through the NAND gate 53. This is because, in the equivalent circuit of the NAND gate 53, the last transistor (not shown) forms a low impedance path to ground. When the film is to be stopped and the input 52 of the NAND gate 53 goes to 0 as previously described, the output transistor of the equivalent circuit of the NAND gate 53 is open-circuited so that there is no longer a low impedance path from the capacitance 71 to ground through the NAND gate 53. Accordingly, the capacitance 71 begins to charge and, depending upon the time constants of the system, its voltage will raise within a predetermined time interval to a level sufficient to reduce the output of the NAND gate 56 to 0. This time interval is adjustable by adjusting the value of the resistance 69. It is possible for the output of the NAND gate 56 to go to zero even though the output of the NAND gate 55 is tending positive because the output transistor in the equivalent circuit of the NAND gate 56 forms a low impedance path to ground.

When the output of the NAND gate 56 goes to 0, the output of the NAND gate 58 rises to the given positive value, causing the logic circuit 61 to drive the amplifier 62 and to cease driving the amplifier 64. Accordingly, the clutch 46 is energized and the brake 47 is de-energized, causing the drive motor to begin rotating the capstan 26 to reinitiate movement of the film 12 through the view station 13. In addition, the feedback from the output of the NAND gate 58 to the input 59 of the NAND gate 53 and to the input 60 of the NAND gate 55 places the latter two NAND gates in condition for producing zero outputs (the running condition) when the film has moved the optical stripe far enough that a positive voltage output is produced by the logic circuit 45.

It may therefore be seen that the invention provides an improved film transport for monitoring successive frames of film. The film may be rapidly positioned in accurate alignment in a film gate so that each frame may be viewed while stationary and the time between stopping of the film and the automatic restarting of the film is adjustable as desired. Although only logic circuitry related to operation of the invention has been described herein, the illustrated film transport may incorporate other logic circuitry, not shown, to perform other functions, such as running the film leader through during startup, frame counting, and rapid multiple-frame advancing (e.g. 10 frames or 100 frames).

Various modifications of the invention in addition to those shown and described herein will become apparent to those skilled in the art from the foregoing description and accompanying drawings. Such modifications are intended to fall within the scope of the appended claims.

What is claimed is:

1. A film transport comprising, drive means for transporting the film through a viewing position, said drive means including a motor and a capstan driven thereby, means for controlling the operation of said drive means, said controlling means being responsive to a first input signal to stop said drive means at the viewing position after a given time interval from receipt of the first input signal and being responsive to a second input signal to operate said drive means, sensing means for supplying said first input signal to said controlling means the given time interval prior to arrival of a frame of the film at the viewing position, and means for supplying said second input signal to said controlling means after a time interval from the stopping of said drive means.

2. A film transport according to claim 1 wherein said controlling means include first, second and third two-input NAND gates, serially connected in stated order, and a fourth two-input NAND gate connected in parallel with said first and second NAND gates, wherein said first and fourth NAND gates each include a first input connected to said sensing means and a second input connected to the output of said third NAND gate, wherein said second NAND gate includes one open-circuited input and the other input is connected to said delay means, and wherein said third NAND gate includes one open-circuited input, whereby said third NAND gate produces no output signal immediately after receipt of said first input signal and produces an output signal immediately after receipt of said second input signal.

3. A film transport according to claim 2 wherein said delay means include resistance means and capacitance means serially connected across a source of potential, said input of said second NAND gate being connected to the juncture between said resistance means and said capacitance means.

4. A film transport according to claim 1 wherein said drive means includes a motor and a capstan driven thereby, wherein said controlling means include a brake for stopping said capstan in response to the first input signal and for releasing said capstan in response to the second input signal, and wherein said controlling means further include a clutch for decoupling said capstan from said motor in response to the first input signal and for coupling said capstan to said motor in response to the second input signal.

5. A film transport according to claim 1 for use with film having a plurality of frames, each frame having a signalling area adjacent thereto extending across and being bisected by the frame's transverse optical axis, wherein the given stopping time interval is sufficient to allow the film to move a predetermined distance, and wherein said sensing means operate to supply the input signal to said controlling means upon arrival of a frame of the film at a position a distance from the viewing position which is equal to the predetermined distance.

6. A film transport according to claim 5 wherein said controlling means include variable delay means for adjusting the stopped position of the film.

7. A film transport according to claim 5 wherein the signalling areas comprise optical stripes, and wherein said sensing means comprise a light sensitive electrical circuit.

8. A film transport according to claim 1 wherein said second signal supplying means are automatic and incorporate variable delay means for selectably adjusting the time interval from the stopping of said drive means.

9. A film transport according to claim 8 wherein said variable delay means include a variable resistance-capacitance time delay circuit responsive to production of said first input signal to produce said second input signal after the predetermined time interval.

References Cited

UNITED STATES PATENTS

| 2,985,764 | 5/1961 | Koenig | 353—95 |
| 3,232,167 | 2/1966 | Schwartz et al. | 353—120 |

FOREIGN PATENTS

| 215,804 | 6/1958 | Australia. |

HARRY N. HAROIAN, Primary Examiner

U.S. Cl. X.R.

353—120